US010584611B2

(12) United States Patent
Pelella et al.

(10) Patent No.: US 10,584,611 B2
(45) Date of Patent: Mar. 10, 2020

(54) TURBOMACHINE WITH A COOLED COUPLING GUARD

(71) Applicant: Nuovo Pignone Srl, Florence (IT)

(72) Inventors: Marco Pelella, Florence (IT); Andrea Bernocchi, Florence (IT); Angelo Grimaldi, Florence (IT); Simone Tanteri, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 425 days.

(21) Appl. No.: 15/031,989

(22) PCT Filed: Oct. 24, 2014

(86) PCT No.: PCT/EP2014/072835
§ 371 (c)(1),
(2) Date: Apr. 25, 2016

(87) PCT Pub. No.: WO2015/059267
PCT Pub. Date: Apr. 30, 2015

(65) Prior Publication Data
US 2016/0281508 A1 Sep. 29, 2016

(30) Foreign Application Priority Data

Oct. 25, 2013 (IT) .............................. CO2013A0052

(51) Int. Cl.
F01D 25/12 (2006.01)
F01D 5/02 (2006.01)
(Continued)

(52) U.S. Cl.
CPC ........... F01D 25/125 (2013.01); F01D 5/026 (2013.01); F01D 25/12 (2013.01); F04D 29/044 (2013.01);
(Continued)

(58) Field of Classification Search
CPC ........ F01D 5/026; F01D 25/12; F01D 25/125; F02C 7/18; F02C 7/185; F04D 29/044;
(Continued)

(56) References Cited

U.S. PATENT DOCUMENTS 3,101,890 A 8/1963 Carlson
3,805,553 A 4/1974 Yehl
(Continued)

FOREIGN PATENT DOCUMENTS

CN 201407074 Y 2/2010
EP 2599967 A1 6/2013
(Continued)

OTHER PUBLICATIONS

Italian Search Report and Opinion issued in connection with Corresponding IT Application No. IT CO2013A000052 dated Jul. 9, 2014.
(Continued)

Primary Examiner — Josh Skroupa
(74) Attorney, Agent, or Firm — Baker Hughes Patent Organization

(57) ABSTRACT

A coupling guard for a rotating member comprising a shell surrounding the rotating member, a plenum disposed in the shell, at least an injection tube for injecting a cooling gas and an outlet for discharging the cooling gas, wherein the injection tube extends through the plenum from a first axial opening proximal to the shell to a second axial opening proximal to the rotating member, the injection tube having a leading edge which first contacts the gas circulating in the plenum and a trailing edge opposite to the leading edge, the second opening having a first portion orthogonal to the axis of the injection tube and a second portion across the trailing edge, adjacent to the first portion and parallel to the axis of the injection tube.

7 Claims, 2 Drawing Sheets

(51) Int. Cl.
*F16D 3/84* (2006.01)
*F04D 29/58* (2006.01)
*F04D 29/044* (2006.01)

(52) U.S. Cl.
CPC ....... *F04D 29/582* (2013.01); *F04D 29/5846* (2013.01); *F16D 3/84* (2013.01); *F16D 2300/0212* (2013.01); *F16D 2300/0214* (2013.01); *Y10T 464/10* (2015.01)

(58) Field of Classification Search
CPC ............... F04D 29/5806; F04D 29/582; F04D 29/5846; F16D 3/84; F16D 3/843; F16D 2300/021; F16D 2300/0212; F16D 2300/0214; Y10T 464/10
USPC .......................................... 464/17, 170, 185
See application file for complete search history.

(56) References Cited

U.S. PATENT DOCUMENTS

| | | |
|---|---|---|
| 4,549,740 A | 10/1985 | Nutter et al. |
| 4,848,409 A | 7/1989 | Jahnke, Jr. |
| 5,605,045 A * | 2/1997 | Halimi ................... F01D 5/085 310/52 |
| 6,467,578 B1 | 10/2002 | Winfree |
| 6,474,934 B1 | 11/2002 | Jahnke, Jr. et al. |
| 9,957,893 B2 * | 5/2018 | Takiguchi ................. F23R 3/42 |
| 2009/0123306 A1 | 5/2009 | Rowe, Jr. |
| 2012/0121374 A1 | 5/2012 | Santhosh et al. |

FOREIGN PATENT DOCUMENTS

| | | |
|---|---|---|
| JP | S61-012902 U1 | 1/1986 |
| JP | H04-110223 U1 | 9/1992 |
| JP | 2009-108961 A | 5/2009 |

OTHER PUBLICATIONS

PCT Search Report and Written Opinion issued in connection with Corresponding Application No. PCT/EP2014/072835 dated Jan. 29, 2015.

Unofficial English Translation of Chinese Office Action issued in connection with corresponding CN Application No. 201480058615.8 dated Nov. 18, 2016.

Machine translation and Notification of reasons for refusal issued in connection with corresponding JP Application No. 2016-525000 dated Aug. 28, 2018.

* cited by examiner

TURBOMACHINE WITH A COOLED COUPLING GUARD

BACKGROUND

Embodiments of the present invention relate to a coupling guard for a rotating member of a turbomachine.

It is well known to apply an air or nitrogen venting to a coupling guard in order to avoid oil migration into the coupling guard. One of these systems is for example described in U.S. Pat. No. 6,474,934.

However, known venting systems are not in general successful to guarantee the right flow to keep coupling guard skin temperature below acceptable values and in addition to avoid oil migration from shaft ends. Such problems are typically solved by increasing the coupling guard overall dimensions and by adding oil guards, for example including seals at the shaft ends. Such solutions have been however demonstrated to be a trial and error approach, which in some cases are not able to keep the skin temperature below 150° C. and not able to stop successfully the oil migration. Further geometrical constraints do not always allow to modify the overall dimensions of the coupling guards or to add oil guards.

It is therefore desirable to modify known venting systems in order to achieve acceptable temperature of the coupling guard skin, at the same time avoiding oil migration from shaft ends and without modifying the overall dimension of the coupling guards or adding oil guards.

BRIEF SUMMARY OF THE INVENTION

According to a first embodiment, the present invention accomplishes such an object by providing a rotating machine comprising a rotating member and a coupling guard, the coupling guard comprising: a shell surrounding the rotating member, a plenum disposed in the shell, at least an injection tube for injecting a cooling gas and an outlet for discharging the cooling gas so that rotation of the rotating member draws cooling gas through the injection tube and into the plenum, and so that the cooling gas circulates through the plenum substantially circularly or spirally to cool the shell before the cooling gas exhausts through the outlet; wherein the injection tube extends radially through the plenum from a first opening proximal to the shell to a second opening proximal to the rotating member, the injection tube having a leading edge which first contacts the gas circulating in the plenum and a trailing edge opposite to the leading edge, the second opening having a first portion oriented substantially tangentially and substantially parallel to the circulation direction of the cooling gas and a second portion oriented substantially radially and substantially orthogonal to the circulation direction of the cooling gas.

The first portion facing in a direction concurrent to the direction of the cooling gas.

The shape of the injection tubes jointly with its length and position inside the enclosure, creates a delta pressure across the tube itself to allow the cooling gas flow (for example atmospheric air or nitrogen) inside the coupling guard plenum. This allows keeping the temperature skin of the shell below 100° C.

A further advantages of embodiments of the present invention is the fact that the cooling gas flow creates also an internal overpressure inside the coupling guard plenum, which prevents oil migration from shaft ends.

BRIEF DESCRIPTION OF THE DRAWINGS

Other object feature and advantages of the present invention will become evident from the following description of the embodiments of the invention taken in conjunction with the following drawings, wherein.

DETAILED DESCRIPTION

Figure 1:
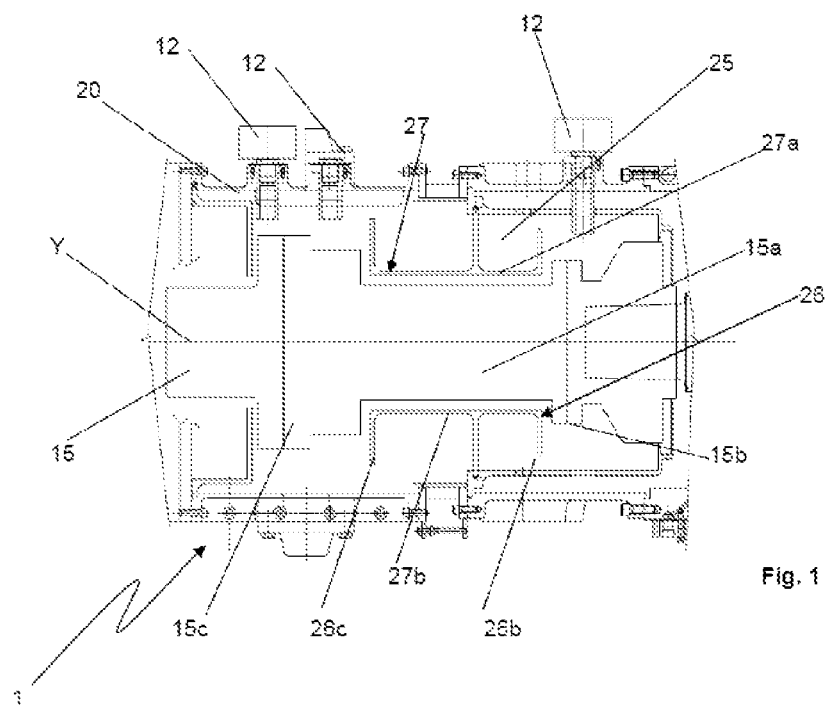
FIG. 1 is a sectional lateral view of a coupling guard according to an embodiment of the present invention.

With reference to the attached figures, a rotating member 15 having a rotation axis Y is enclosed in a coupling guard 1 comprising a shell 11 and a plenum 25 disposed in the shell 11 around the rotating member 15.

The rotating member 15 includes a central shaft 15a and a couple of lateral disks 15b, 15c. According to other embodiments of the invention, not shown in the drawings, the rotating member 15 could be of any other different configuration.

The shell 11 includes a lower semi-cylindrical portion 11a and an upper semi-cylindrical portion 11b. The lower and upper portions 11a, 11b contacts each other and are joined together along a horizontal plane including the rotation axis Y.

The coupling guard 1 includes one or more injection tubes 12 (three injection tubes 12 in the embodiment of FIG. 1) for injecting a cooling gas and one or more outlets 13 (one outlet 13 in the embodiment of FIG. 2) for discharging the cooling gas so that, in operation, rotation of the rotating member 15 around axis Y draws cooling gas through each injection tube 12 and into the plenum 25. The upper semi-cylindrical portion 11b includes an inner radial fin 20 positioned, with respect to the rotational movement R of the rotating member 15 (clockwise in FIG. 2), downstream of the outlet 13. The cooling gas circulates through the plenum 25 to cool the shell 11 before exhausting through the outlets 13, helped by the presence of the fin 20.

Each injection tube 12 is mounted on the upper portion 11b of the shell 11 in such a way it extends through the plenum 25 from a first axial circular opening 31 proximal to the shell 11 to a second axial opening 32 proximal to the rotating member 15. In an embodiment, the second axial opening 32 is closer as possible to the rotating member 15, in order to maximise the flow within injection tubes 12 due to the wake effect generated by the rotation of the rotating member 15.

Each injection tube 12 tube is oriented with respect to the rotational movement R of the rotating member 15 around the axis Y in such a way that the injection tube 12 has a leading edge 41 which first contacts the gas circulating in the plenum 25 and a trailing edge 42 opposite to the leading edge 41, the second axial opening 32 having a first circular axial portion 32a orthogonal to the axis X of the injection tube 12 and a second lateral portion 32b extending across the trailing edge 42. The length of the leading edge 41 is to be chosen with respect to the diameter of the injection tube 12 in such a way that the leading area is between 0.5 to 1.5 times the external cross area of the injection tube 12. The diameter and thickness of the injection tube 12 is to be chosen in order that the external cross area of the injection tube 12 does not allow the flow of the cooling gas in the injection tube 12 to reach a velocity value greater than 50 m/s.

The second lateral portion 32b is delimited by the first circular axial portion 32a, by an upper edge 34c having the shape of an arch and parallel to the first circular axial portion 32a and by two lateral opening edges 34a, 34b extending from the first portion 32a towards the first axial opening 31 till the upper edge 34c. The two lateral edges 34a, 34b are parallel to the axis X of the injection tube 12 and are angularly distanced around the axis X of an opening angle A comprised between 90° and 180°.

More particularly, the opening angle A is comprised between 140° and 160°.

Figure 4:
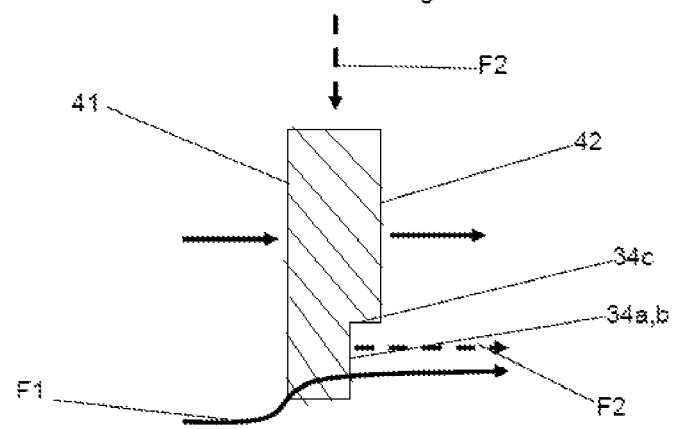
FIG. 4 is a lateral cross sectional view of the component of FIG. 3.
Figure 5:
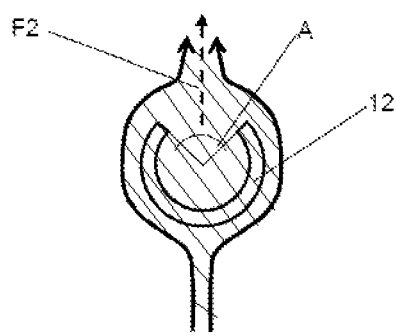
FIG. 5 is a schematic cross sectional view of the component of FIG. 3.

For the shape of the injection tube 12 and in particular of the second axial opening 32, the gas circulated in the plenum 25 when the rotating member 15 rotates around the axis Y follows a path (which is represented in FIG. 4 by an arrow F1) which crosses the first and second portions 32a, b of the second axial opening 32 in series. This has the effect of creating a delta pressure across the injection tube 12 to allow the cooling gas to flow through the injection tube 12 according to a second path (which is represented in FIGS. 4 and 5 by arrows F2). The second path F2 enters the first axial opening 31 radially and exit from the second portions 32b of the second axial opening 32 according to a circumferential direction orthogonal to the lateral edges 34a, 34b.

Each injection tube 12 is positioned on upper semi-cylindrical portion 11b of the shell 11. Considering that the upper portion of the skin surface of the coupling guard 1 is the hottest portion of the skin surface of the coupling guard 1, the injection tube 12, with respect to a vertical plane including the rotating axis Y of the rotating member 15, is angularly spaced of a positioning angle B which is greater than 10° but lower than 90°. More particularly the angle B is lower than 45°.

When the overall dimensions of the coupling guard 1 and the operating conditions of the rotating parts are such that the gas circulating in the plenum 25 reaches turbulent conditions, according to possible embodiments of the present invention, one or more screens 26 are fixed to an inner side of the shell 11 to create rotating volumes of small thickness around the rotating member 15. The effect is that of reducing the friction coefficient due to the reduced distance between the rotoric and statoric boundary layers. The reduction of the friction coefficient causes the reduction of the heat generation and consequently reduces the coupling guard skin temperature.

Figure 2:
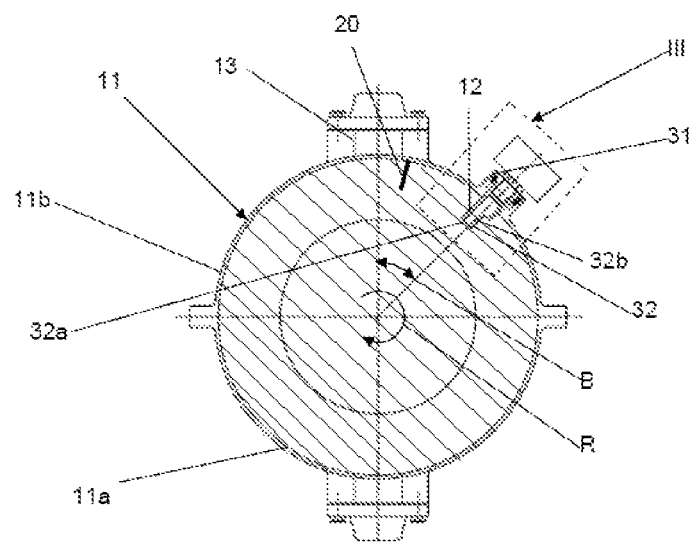
FIG. 2 is a cross sectional view of the coupling guard of FIG. 1.
Figure 3:
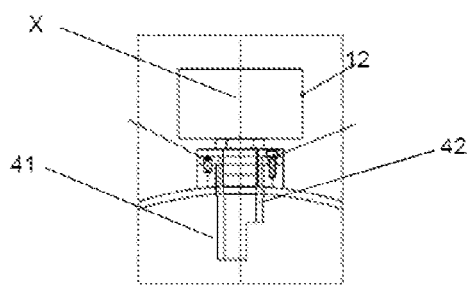
FIG. 3 is a detailed view of the component III of FIG. 2.

In the embodiment of the attached FIGS. 1 and 5 the screen 26 comprises a cylindrical panel 27 around the shaft 15a and two planar circular panel 26b, 26c respectively close to the disks 15b, 15c. The cylindrical panel 27 includes a lower semi-cylindrical portion 27a and an upper semi-cylindrical portion 27b. The lower and upper portions 27a, b contacts each other and are joined together along a horizontal plane including the rotation axis Y.

In general, for all embodiments, a distance comprised between 1 mm and 50 mm has to be provided between each component of the rotating member 15 and the screen 26 in order to assure to have the rotoric boundary layer as close as possible to the condition of touching the statoric boundary layer.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotating machine comprising a rotating member and a coupling guard, the coupling guard comprising:
   a shell surrounding the rotating member,
   a plenum disposed in the shell; and
   at least an injection tube for injecting a cooling gas and an outlet for discharging the cooling gas so that a rotational movement of the rotating member draws cooling gas through the injection tube and into the plenum,
   wherein the cooling gas circulates through the plenum substantially circularly or spirally to cool the shell before the cooling gas exhausts through the outlet; and
   wherein the injection tube extends radially through the plenum from a first opening proximal to the shell to a second opening proximal to the rotating member, wherein the injection tube is oriented with respect to the rotational movement of the rotating member around a y axis such that the injection tube having a leading edge which first contacts the cooling gas circulating in the plenum and a trailing edge opposite to the leading edge, the second opening having a first portion oriented substantially tangentially and substantially parallel to the circulation direction of the cooling gas, a second portion oriented substantially radially and substantially orthogonal to the circulation direction of the cooling gas, wherein the second portion of the second opening is delimited by two opening edges extending from the first portion towards the first axial opening parallel to the axis of the injection tube, wherein the two opening edges are angularly distanced around the axis of an opening angle comprised between 90° and 180°.

2. The coupling guard according to claim 1, wherein the first portion faces in a direction concurrent to the direction of the cooling gas.

3. The coupling guard according to claim 2, wherein the opening angle is comprised between 140° and 160°.

4. The coupling guard according to claim 1, wherein the opening angle is comprised between 140° and 160°.

5. The coupling guard according to claim 1, wherein with respect to a vertical plane including the rotating axis of the rotating member the injection tube is angularly spaced at a positioning angle lower than 45°.

6. The coupling guard according to claim 1, further including at least a screen fixed to an inner side of the shell to reduce the thickness of the upper part of the plenum where the diameter of the rotating member is minimum.

7. The coupling guard according to claim 6, wherein the distance between the rotating member and the screen is comprised between 1 mm and 50 mm.

* * * * *